No. 755,653.

Patented March 29, 1904.

UNITED STATES PATENT OFFICE.

FREDERICK E. GRIMM, OF UTICA, NEW YORK.

MATCH COMPOSITION.

SPECIFICATION forming part of Letters Patent No. 755,653, dated March 29, 1904.

Application filed January 11, 1904. Serial No. 188,652. (No specimens.)

*To all whom it may concern:*

Be it known that I, FREDERICK E. GRIMM, of Utica, in the county of Oneida and State of New York, have invented certain new and useful Improvements in Match Compositions; and I do hereby declare that the following is a full, clear, and exact description of the invention, which will enable others skilled in the art to which it appertains to make and use the same.

The object of my invention is to provide a non-poisonous match composition.

Heretofore various efforts have been made to provide a non-poisonous match composition which has been more or less successful; but one objection observed with reference to them is that they fail to ignite the stem satisfactorily and are affected by atmospheric moisture. My composition is free from the objections noted in prior ones, more particularly in these respects.

My composition consists of the following ingredients in about the proportions specified, although I do not limit myself strictly to the proportions given: thirty-five parts, by weight, of glue, thirty-five parts, by weight, of oxid of zinc, sixty-five parts, by weight, of ground glass, ten parts, by weight, of gum-benzoin, twenty parts, by weight, of amorphous phosphorus, five parts, by weight, of sulfur flours, fifteen parts, by weight, of hyposulfite of lead, and one hundred and fifteen parts, by weight, of chlorate of potassium, with a sufficient coloring-dye preferably.

The above ingredients are mixed with water to furnish a suitable thin paste for dipping or applying to the match stem or stick, and of course the process is preferably performed by machinery, both as to mixing the paste and applying it to the woods or sticks.

Matches made with the above composition will ignite freely and satisfactorily, and the ignition being communicated to the stem in a satisfactory manner they are free from poisonous vapors, which is a very desirable point to attain.

What I claim as new, and desire to secure by Letters Patent, is—

A match composition, consisting of glue, oxid of zinc, ground glass, gum-benzoin, amorphous phosphorus, sulfur flours, hyposulfite of lead, and chlorate of potassium in about the proportions hereinbefore specified.

In witness whereof I have affixed my signature, in presence of two witnesses, this 8th day of January, 1904.

F. E. GRIMM.

Witnesses:
EMMA S. HESSE,
WM. F. GRIMM.